(12) United States Patent
Nishimine et al.

(10) Patent No.: US 9,688,132 B2
(45) Date of Patent: Jun. 27, 2017

(54) HYBRID VEHICLE

(71) Applicant: TOYOTA JIDOSHA KABUSHIKI KAISHA, Toyota-shi (JP)

(72) Inventors: Akiko Nishimine, Toyota (JP); Yota Mizuno, Nissin (JP); Sohei Murata, Chiryu (JP); Kensei Hata, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 68 days.

(21) Appl. No.: 14/944,588

(22) Filed: Nov. 18, 2015

(65) Prior Publication Data
US 2016/0137050 A1  May 19, 2016

(30) Foreign Application Priority Data

Nov. 19, 2014  (JP) .................................. 2014-234960

(51) Int. Cl.
*B60W 30/184* (2012.01)
*B60K 6/365* (2007.10)
(Continued)

(52) U.S. Cl.
CPC .............. *B60K 6/365* (2013.01); *B60K 6/445* (2013.01); *B60W 10/08* (2013.01); *B60W 10/30* (2013.01); *B60W 20/00* (2013.01); *B60W 20/10* (2013.01); *B60W 30/184* (2013.01); *B60W 30/1846* (2013.01); *B60K 2006/381* (2013.01); *B60W 2510/107* (2013.01); *B60W 2520/10* (2013.01); *B60W 2710/081* (2013.01);
(Continued)

(58) Field of Classification Search
CPC ............ B60W 20/10; B60W 30/1846; B60W 30/1843
See application file for complete search history.

(56) References Cited

U.S. PATENT DOCUMENTS 5,662,188 A     9/1997  Ito et al.
9,555,794 B2 *  1/2017  Hata ..................... B60K 6/445
(Continued)

FOREIGN PATENT DOCUMENTS

JP       8-105520 A    4/1996
JP    2012-106599 A    6/2012
(Continued)

*Primary Examiner* — Sherry Estremsky
(74) *Attorney, Agent, or Firm* — Oblon, McClelland, Maier & Neustadt, L.L.P.

(57) ABSTRACT

A hybrid vehicle uses a first motor, a second motor and an engine as driving force sources and includes a gear transmission mechanism and an oil supply mechanism. The gear transmission mechanism transmits torque, output from the first motor, to a drive shaft side. The oil supply mechanism is driven by power other than power of the engine to supply oil to the gear transmission mechanism. When the hybrid vehicle is caused to travel by using the torque output from at least the first motor in a state where operation of the engine is stopped, and when an estimated amount of oil that is supplied from the oil supply mechanism to the gear transmission mechanism is smaller than or equal to a predetermined amount, an electronic control unit limits an operation state of the first motor such that load on the gear transmission mechanism decreases.

9 Claims, 8 Drawing Sheets

(51) Int. Cl.
  *B60W 20/00* (2016.01)
  *B60K 6/445* (2007.10)
  *B60W 10/08* (2006.01)
  *B60W 10/30* (2006.01)
  *B60W 20/10* (2016.01)
  *B60K 6/38* (2007.10)
(52) U.S. Cl.
  CPC .... *B60W 2710/083* (2013.01); *B60Y 2400/74* (2013.01); *Y02T 10/6239* (2013.01); *Y10S 903/906* (2013.01); *Y10S 903/91* (2013.01)

(56) References Cited

U.S. PATENT DOCUMENTS

| | | |
|---|---|---|
| 2010/0320019 A1 | 12/2010 | Gale et al. |
| 2014/0358349 A1 | 12/2014 | Okuda et al. |
| 2015/0224868 A1 | 8/2015 | Makino |
| 2015/0367832 A1* | 12/2015 | Oshiumi ............... B60K 6/445 701/22 |
| 2016/0280215 A1* | 9/2016 | Nishimine ........... B60W 20/20 |
| 2016/0332614 A1* | 11/2016 | Ogura .................. B60W 20/00 |

FOREIGN PATENT DOCUMENTS

| | | |
|---|---|---|
| JP | 5385880 B2 | 1/2014 |
| JP | 2014-093845 | 5/2014 |
| KR | 10-2014-0103170 A | 8/2014 |
| WO | WO 2013/094043 A1 | 6/2013 |

\* cited by examiner

HYBRID VEHICLE

INCORPORATION BY REFERENCE

The disclosure of Japanese Patent Application No. 2014-234960 filed on Nov. 19, 2014 including the specification, drawings and abstract is incorporated herein by reference in its entirety.

BACKGROUND OF THE DISCLOSURE

1. Field of the Disclosure

The present disclosure relates to a hybrid vehicle configured to transmit power, which is output from an engine or a motor or both, to a drive shaft via a gear transmission mechanism, such as a planetary gear mechanism.

2. Description of Related Art

International Application Publication No. 2013/094043 describes an invention that relates to a hybrid vehicle. In the hybrid vehicle that uses a first motor, a second motor and an engine as driving force sources, the hybrid vehicle includes a planetary gear mechanism and a lock mechanism. The planetary gear mechanism transmits power, which is output from the first motor or the engine or both, to a drive wheel side. The lock mechanism stops the rotation of one rotating element (specifically, a rotating element to which an output shaft of the engine is coupled) of the planetary gear mechanism. The hybrid vehicle described in the International Application Publication No. 2013/094043 intends to suppress a decrease in the durability of the above-described planetary gear mechanism. For this purpose, the hybrid vehicle described in the International Application Publication No. 2013/094043 is configured to, in a state where the rotation speed of each of the pinion gears that are component elements of the planetary gear mechanism increases as a result of activating the lock mechanism, reduce a driving torque shared by the first motor within a required driving torque as the rotation speed of each pinion gear increases.

As described above, in the hybrid vehicle described in the International Application Publication No. 2013/094043, the output of the first motor is limited in consideration of the rotation speed of each pinion gear in order to protect the pinion gears of the planetary gear mechanism. Therefore, even when the rotation of one rotating element of the planetary gear mechanism is stopped and then the rotation speed of each pinion gear of the planetary gear mechanism increases, an excessive increase in the rotation speed of each pinion gear is suppressed by limiting the output of the first motor. Therefore, an excessive increase in the rotation speed of each pinion gear is avoided, so it is possible to suppress a decrease in the durability of the planetary gear mechanism due to abrasion of the pinion gears.

BRIEF SUMMARY

On the other hand, in the hybrid vehicle described in the International Application Publication No. 2013/094043, the amount, state, or the like, of oil that is supplied to the planetary gear mechanism is not taken into consideration. Therefore, if the amount of oil that is supplied to the planetary gear mechanism becomes insufficient, there is a possibility that seizure occurs in the pinion gears and, as a result, the durability of the planetary gear mechanism decreases. The amount and state of oil, that is supplied to the planetary gear mechanism for lubrication and cooling, change depending on an oil temperature and a vehicle speed. For example, when the viscosity of oil is high because of a low oil temperature, flowability decreases, with the result that the amount of oil that is fed under pressure from an oil pump and supplied to the pinion gears decreases. When the viscosity of oil is low because of a high oil temperature or when the rotation speed of each pinion gear is high because of a high vehicle speed, oil supplied to the pinion gears does not adhere to the pinion gears and is rejected, with the result that the amount of oil that is supplied to the pinion gears decreases. Therefore, in the hybrid vehicle described in the International Application Publication No. 2013/094043, even when the output of the first motor is limited in consideration of the rotation speed of each pinion gear as described above, there is a case where the durability of the planetary gear mechanism decreases because of an insufficient amount of oil supplied to the planetary gear mechanism.

In addition, in the hybrid vehicle described in the International Application Publication No. 2013/094043, irrespective of the amount, state, or the like, of oil that is supplied to the planetary gear mechanism, when the rotation speed of each pinion gear becomes higher than or equal to a predetermined rotation speed, the output of the first motor is limited without any exception. Therefore, although oil is appropriately supplied to the pinion gears and the output of the first motor actually does not need to be limited, there is a possibility that the output of the first motor is limited. For this reason, in an EV mode in which the hybrid vehicle is caused to travel in a state where the engine is stopped, there is a case where a driving region in which the vehicle is allowed to be driven at a high power by using the output of both the first motor and the second motor narrows and, as a result, the EV traveling performance of the hybrid vehicle decreases.

The present disclosure provides a hybrid vehicle that is able to improve the durability of a gear transmission mechanism that transmits the output torque of a driving force source to a drive shaft side and to improve EV traveling performance by appropriately ensuring a driving region in which the vehicle is allowed to travel in an EV mode at a high power.

An aspect of the disclosure provides a hybrid vehicle including an engine, a first motor, a second motor, a gear transmission mechanism, an oil supply mechanism, and an electronic control unit. The gear transmission mechanism is configured to transmit torque, output from the first motor, to a drive shaft side. The oil supply mechanism is configured to be driven by power other than power of the engine. The oil supply mechanism is configured to supply oil to the gear transmission mechanism. The gear transmission mechanism is a planetary gear mechanism including, as rotating elements, a sun gear, a ring gear and a carrier to which torque output from the engine is transmitted. The first motor is coupled to one of the sun gear and the ring gear. An output member that transmits power to the drive shaft side is coupled to the other one of the sun gear and the ring gear. The second motor is coupled to the output member. A brake mechanism that selectively stops rotation of the carrier is coupled to the carrier. When the hybrid vehicle is caused to travel by using torque output from both the first motor and the second motor in a state where operation of the engine is stopped and rotation of the carrier is stopped by the brake mechanism, the electronic control unit is configured to (i) estimate the amount of the oil that is supplied from the oil supply mechanism to the planetary gear mechanism and (ii) when the estimated amount of the oil supplied is smaller than or equal to a predetermined amount, limit an operation state of the first motor such that load on the planetary gear mechanism decreases.

In the hybrid vehicle according to the above aspect, the electronic control unit may be configured to estimate the amount of the oil supplied on the basis of an oil temperature of the oil, and the electronic control unit may be configured to reduce an upper limit of the torque output from the first motor as the oil temperature decreases.

In the hybrid vehicle according to the above aspect, the oil supply mechanism may include an oil pump that is driven by torque that is transmitted from the drive shaft side, the oil pump may be configured to supply oil to the planetary gear mechanism, and the electronic control unit may be configured to estimate the amount of the oil supplied on the basis of a vehicle speed, and may be configured to reduce an upper limit of the torque output from the first motor as the vehicle speed decreases. Alternatively, in the hybrid vehicle according to the above aspect, the oil supply mechanism may be a mechanism configured to supply the planetary gear mechanism with oil that is dipped by a gear that rotates by using torque that is transmitted from the drive shaft side, and the electronic control unit may be configured to estimate the amount of the oil supplied on the basis of a vehicle speed, and may be configured to reduce an upper limit of the torque output from the first motor as the vehicle speed decreases.

In the hybrid vehicle according to the above aspect, the electronic control unit may be configured to estimate the amount of the oil supplied on the basis of a vehicle speed, and the electronic control unit may be configured to, when the vehicle speed falls outside a predetermined vehicle speed range, reduce an upper limit of a rotation speed of the first motor.

In the hybrid vehicle according to the above aspect, when the vehicle travels in an EV mode by using the output of the first motor or the output of both the first motor and the second motor, the amount of oil that is supplied from the oil supply mechanism to the gear transmission mechanism, that is, the planetary gear mechanism, is estimated. It is possible to estimate the amount of oil supplied on the basis of the state of oil or the environment in which oil is supplied, for example, an oil temperature, a vehicle speed, or the like. When the estimated amount of oil supplied is smaller than or equal to the predetermined amount, the operation state of the first motor is limited. For example, the upper limit of the torque of the first motor is limited. Alternatively, the upper limit of the rotation speed of the first motor is limited. When the operation state of the first motor is limited in this way, load on the planetary gear mechanism decreases. The predetermined amount of oil supplied is at least the amount of oil that is required not to cause an abnormality, such as seizure and excessive abrasion, in the planetary gear mechanism. Therefore, when oil that is supplied to the planetary gear mechanism becomes insufficient at the time when the vehicle travels in an EV mode while the operation of the engine is stopped, load on the planetary gear mechanism is reduced. Therefore, it is possible to prevent seizure or abnormal abrasion due to an insufficient amount of oil, with the result that it is possible to improve the durability of the planetary gear mechanism. Particularly, when the hybrid vehicle is caused to travel by using torque output from both the first motor and the second motor in a state where the operation of the engine is stopped and the rotation of the carrier is stopped by the brake mechanism, the amount of oil supplied is estimated as described above. When the vehicle travels in the EV mode by using torque output from both the first motor and the second motor while the rotation of the carrier of the planetary gear mechanism is stopped, the sun gear and the ring gear in the planetary gear mechanism rotate in mutually opposite directions, and differential rotation between those sun gear and ring gear increases. As a result, the rotation speed of each of pinion gears that are rotatably supported by the carrier increases, and the temperature of the pinion gears increases. If the temperature of the pinion gears excessively increases, there is a concern that seizure, abnormal abrasion, or the like, occurs. In contrast, according to the disclosure, as described above, when the hybrid vehicle is caused to travel in the EV mode by using torque output from both the first motor and the second motor while the rotation of the carrier is stopped, the amount of oil that is supplied from the oil supply mechanism to the planetary gear mechanism is estimated. When the estimated amount of oil supplied is smaller than or equal to the predetermined amount, the operation state of the first motor is limited. Therefore, it is possible to prevent occurrence of seizure, abnormal abrasion, or the like, by suppressing an increase in the temperature of the pinion gears.

As described above, the amount of oil that is supplied to the gear transmission mechanism, that is, the planetary gear mechanism, is estimated, and the operation state of the first motor is limited in the case where the amount of oil supplied is insufficient. Thus, it is possible to appropriately limit the operation state of the first motor. That is, because the operation state of the first motor is limited when the amount of oil that is supplied to the planetary gear mechanism is insufficient and there is a possibility that an abnormality, such as seizure, occurs in the planetary gear mechanism, the operation state of the first motor is not limited more than necessary. Therefore, it is possible to expand the region in which the first motor is allowed to be operated without limiting the operation state of the first motor as much as possible, and, by extension, it is possible to ensure the region in which the vehicle is allowed to travel in the EV mode at a high power by using the output of both the first motor and the second motor. As a result, it is possible to improve EV traveling performance.

The oil temperature of oil that is supplied to the planetary gear mechanism is detected or estimated, and the amount of oil that is supplied to the planetary gear mechanism is estimated on the basis of the oil temperature. When the oil temperature is low, the viscosity of oil becomes high and the flowability becomes low, so oil is difficult to be supplied to the planetary gear mechanism. Therefore, the amount of oil that is supplied to the planetary gear mechanism decreases. For example, when the oil temperature is lower than or equal to a predetermined temperature, it may be estimated that the amount of oil supplied becomes smaller than or equal to the predetermined amount. When it is estimated that the amount of oil supplied is smaller than or equal to the predetermined amount, the upper limit of torque output from the first motor is reduced as the oil temperature decreases. That is, torque output from the first motor is controlled such that load on the planetary gear mechanism decreases as the oil temperature decreases. Therefore, it is possible to appropriately limit the operation state of the first motor in just proportion in response to the state of oil supplied.

The amount of oil that is supplied to the planetary gear mechanism is estimated on the basis of the vehicle speed. Particularly, when the oil pump that is driven by using torque that is output from the drive shaft side to generate hydraulic pressure or a dip lubrication mechanism of the gear that rotates by using torque that is transmitted from the drive shaft side is provided as the oil supply mechanism, because the amount of oil discharged or the amount of oil dipped becomes small when the vehicle speed is low, the amount of oil that is supplied to the planetary gear mechanism decreases. Therefore, for example, when the vehicle speed is lower than or equal to a predetermined speed, it may be estimated that the amount of oil supplied becomes smaller than or equal to the predetermined amount. When it is estimated that the amount of oil supplied is smaller than or equal to the predetermined amount, the upper limit of torque output from the first motor is reduced as the vehicle speed decreases. That is, torque output from the first motor is controlled such that load on the planetary gear mechanism decreases as the vehicle speed decreases. Therefore, it is possible to appropriately limit the operation state of the first motor in just proportion in response to the state of oil supplied.

According to the disclosure, the amount of oil that is supplied to the planetary gear mechanism is estimated on the basis of the vehicle speed. For example, when the dip lubrication mechanism of the gear that rotates by using torque that is transmitted from the drive shaft side is provided as the oil supply mechanism, because the amount of oil supplied or the amount of oil dipped becomes small when the vehicle speed is low, the amount of oil that is supplied to the planetary gear mechanism decreases. On the other hand, when the vehicle speed is high, gears that constitute the planetary gear mechanism also rotate at a high speed. Therefore, a large centrifugal force acts on oil supplied to the planetary gear mechanism and adhering to the gears, and oil leaves from the gears. Alternatively, oil supplied to the planetary gear mechanism is rejected by the gears that rotate at a high speed. Therefore, when the vehicle speed is high as well, the amount of oil that is supplied to the planetary gear mechanism decreases. For these reasons, for example, when the vehicle speed falls outside the predetermined vehicle speed range, it may be estimated that the amount of oil supplied becomes smaller than or equal to the predetermined amount. When it is estimated that the amount of oil supplied is smaller than or equal to the predetermined amount, the upper limit of the rotation speed of the first motor is reduced. Therefore, it is possible to appropriately limit the operation state of the first motor in response to the state of oil supplied.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
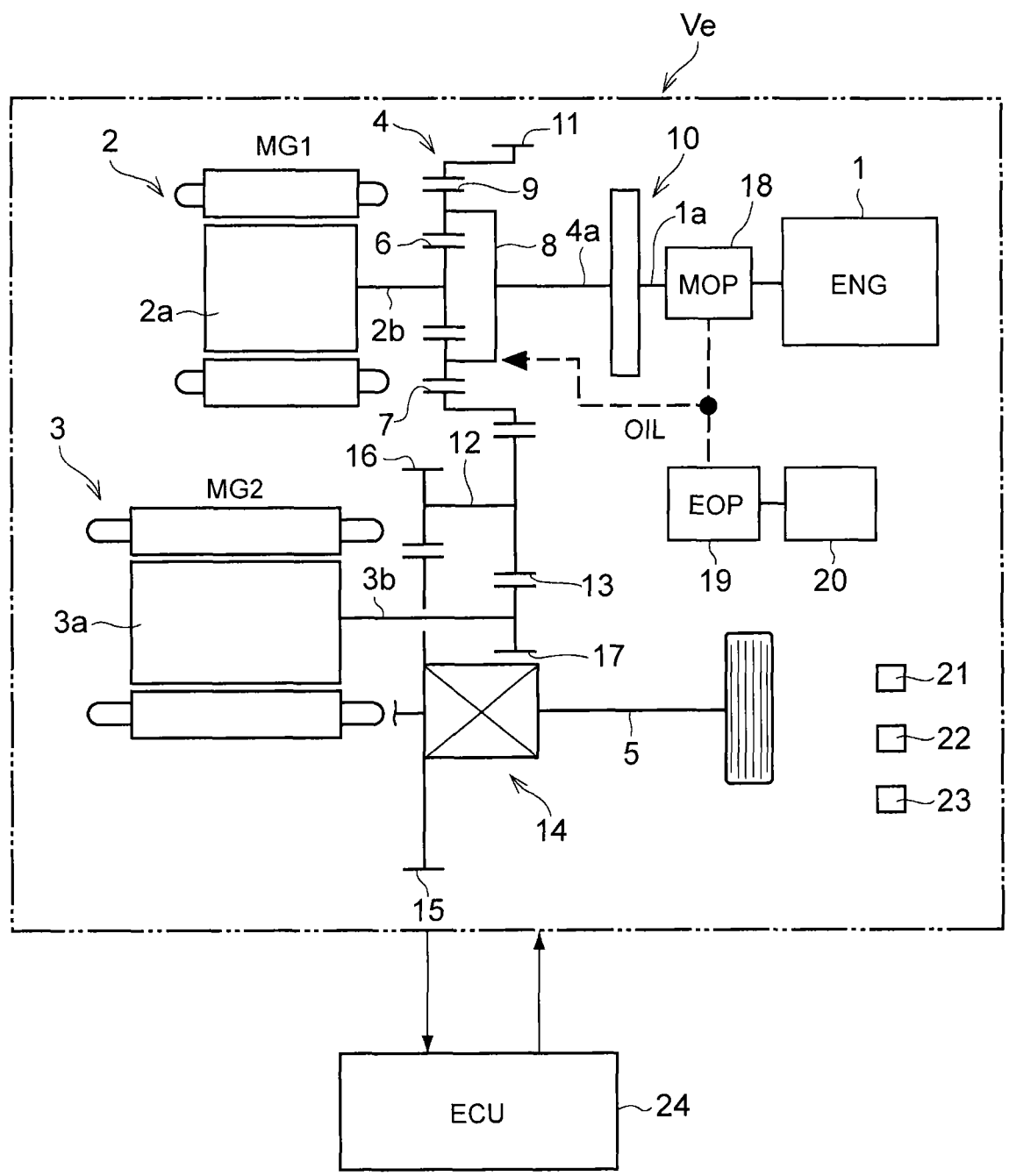
FIG. 1 is a view that shows an example of a hybrid vehicle that may be a controlled target according to the disclosure.

The present disclosure will be specifically described with reference to the accompanying drawings. FIG. 1 shows an example of a hybrid vehicle that may be a controlled target according to the disclosure. A vehicle Ve shown in FIG. 1 is the hybrid vehicle that uses an engine (ENG) 1, a first motor (MG1) 2 and a second motor (MG2) 3 as driving force sources. The vehicle Ve is configured to split power, which is output from the engine 1, by a power split device 4 and transmit the split power to the first motor 2 side and to a drive shaft 5 side. The vehicle Ve is also configured to be able to supply electric power, generated by the first motor 2, to the second motor 3 and add power, which is output from the second motor 3, to the drive shaft 5.

The engine 1 is configured such that adjustment of the output and the operation of a startup or stop of the engine 1 are electrically controlled. For example, in the case of a gasoline engine, a throttle opening degree, the amount of fuel supplied, ignition or stop of ignition, ignition timing, and the like, are electrically controlled.

Each of the first motor 2 and the second motor 3 is a motor having a power generating function (so-called motor generator), and is, for example, a permanent magnet synchronous motor, or the like. Each of the first motor 2 and the second motor 3 is connected to a battery (not shown) via an inverter (not shown), and is configured such that the rotation speed, the torque, switching between the function of a motor and the function of a generator, and the like, are electrically controlled.

The power split device 4 is formed of a differential mechanism including three rotating elements. Specifically, the power split device 4 is formed of a planetary gear mechanism including a sun gear 6, a ring gear 7 and a carrier 8. In the example shown in FIG. 1, a single pinion-type planetary gear mechanism is used.

The planetary gear mechanism that constitutes the power split device 4 is arranged along the same rotation axis as an output shaft 1a of the engine 1. The first motor 2 is coupled to the sun gear 6 of the planetary gear mechanism. The first motor 2 is arranged next to the power split device 4 across from the engine 1. A rotor shaft 2b that rotates integrally with a rotor 2a of the first motor 2 is coupled to the sun gear 6. The ring gear 7, which is an internal gear, is arranged concentrically with respect to the sun gear 6. Pinion gears 9 are in mesh with the sun gear 6 and ring gear 7. The pinion gears 9 are held by the carrier 8 so as to be rotatable and revolvable. An input shaft 4a of the power split device 4 is coupled to the carrier 8. The output shaft 1a of the engine 1 is coupled to the input shaft 4a via a one-way brake 10.

The one-way brake 10 is provided between the output shaft 1a or the carrier 8 and a fixed member (not shown), such as a housing. The one-way brake 10 is configured to, when torque in a direction opposite to the rotation direction of the engine 1 acts on the output shaft 1a or the carrier 8, be engaged to stop the rotation of the output shaft 1a or the carrier 8. By using the thus configured one-way brake 10, it is possible to stop the rotation of each of the output shaft 1a and the carrier 8 in response to the direction in which torque acts. As will be described later, the one-way brake 10 functions as a brake mechanism for stopping the rotation of the output shaft 1a of the engine 1 when the vehicle Ve is caused to travel in the EV mode by using torque output from both the first motor 2 and the second motor 3. Thus, instead of the one-way brake 10, for example, a friction brake, a dog brake, or the like, that is engaged to stop the rotation of the output shaft 1a may be used.

A drive gear 11, which is an external gear, is integrally formed at the outer peripheral portion of the ring gear 7 of the planetary gear mechanism that constitutes the power split device 4. A counter shaft 12 is arranged parallel to the rotation axis of the power split device 4, the first motor 2, or the like. A counter driven gear 13 is connected to one end of the counter shaft 12 (right-side in FIG. 1) so as to rotate integrally with the counter shaft 12. The counter driven gear 13 is in mesh with the drive gear 11. A counter drive gear 16 is connected to the other end of the counter shaft 12 (left-side in FIG. 1) so as to rotate integrally with the counter shaft 12. The counter drive gear 16 is in mesh with a ring gear 15 of a differential gear 14 that is a final reduction gear. Therefore, the ring gear 7 of the power split device 4 is coupled to the drive shaft 5 via a gear train and the differential gear 14. The gear train is formed of the drive gear 11, the counter shaft 12, the counter driven gear 13 and the counter drive gear 16.

Torque that is output from the second motor 3 is allowed to be added to torque that is transmitted from the power split device 4 to the drive shaft 5. That is, the second motor 3 is arranged parallel to the counter shaft 12. A reduction gear 17 is coupled to a rotor shaft 3b that rotates integrally with a rotor 3a of the second motor 3. The reduction gear 17 is in mesh with the counter driven gear 13. Therefore, the drive shaft 5 and the second motor 3 are coupled to the ring gear 7 of the power split device 4 via the above-described gear train or the reduction gear 17.

As described above, in the vehicle Ve, the output shaft 1a of the engine 1 and the rotor shaft 2b of the first motor 2 are coupled to the drive shaft 5-side gear train and the differential gear 14 via the power split device 4. That is, torque output from the engine 1 and the first motor 2 is transmitted to the drive shaft 5 side via the power split device 4 formed of the planetary gear mechanism. Therefore, the power split device 4 in the vehicle Ve is configured to at least transmit torque output from the first motor 2 to the drive shaft 5 side, and corresponds to a gear transmission mechanism according to the disclosure. As described above, the vehicle Ve is configured to transmit power between the ring gear 7 of the power split device 4 and both the differential gear 14 and the drive shaft 5 via the gear train formed of the drive gear 11, the counter shaft 12, the counter driven gear 13 and the counter drive gear 16. The second motor 3 is coupled to the gear train via the reduction gear 17. Therefore, the reduction gear 17 and the gear train formed of the drive gear 11, the counter shaft 12, the counter driven gear 13 and the counter drive gear 16 correspond to an output member according to the disclosure.

Two oil pumps are provided in the vehicle Ve in order to cool or lubricate the planetary gear mechanism in the power split device 4. The two oil pumps are an oil pump 18 and an oil pump 19 that assists the oil pump 18.

The oil pump 18 (hereinafter, the MOP 18) is a general mechanical oil pump that is conventionally used in an engine or a transmission for a vehicle as a pump for supplying oil and controlling hydraulic pressure. The MOP 18 is configured to be driven by torque that is output from the engine 1 to generate hydraulic pressure. Specifically, the rotor (not shown) of the MOP 18 is configured to rotate together with the output shaft 1a of the engine 1. Therefore, when the engine 1 is operated through combustion to output torque from the output shaft 1a, the MOP 18 is also driven to generate hydraulic pressure.

As described above, the MOP 18 is not able to generate hydraulic pressure when the rotation of the output shaft 1a of the engine 1 is stopped. Therefore, the vehicle Ve includes the oil pump 19 in order to keep supplying oil to the planetary gear mechanism of the power split device 4 even when the engine 1 is stopped.

The oil pump 19 (hereinafter, EOP 19) is an electric oil pump that is driven by torque that is output from an electric motor to generate hydraulic pressure. Therefore, the EOP 19 is provided in association with a pump motor 20 for driving the EOP 19. The pump motor 20 is an electric motor different from the driving force sources of the vehicle Ve, such as the engine 1, the first motor 2 and the second motor 3, and is exclusively provided for the EOP 19.

As described above, the EOP 19 is configured to supply oil to the planetary gear mechanism of the power split device 4 by being driven by a power source other than the engine 1 to generate hydraulic pressure. Therefore, in the configuration example shown in FIG. 1, the EOP 19 corresponds to an oil supply mechanism according to the disclosure.

An oil temperature sensor 21 is provided. The oil temperature sensor 21 is used to detect the temperature of oil that is supplied to each of oil supply portions by the MOP 18 or the EOP 19. The oil temperature sensor 21 is, for example, configured to detect the temperature of oil stored in an oil pan (not shown), or the like. It is possible to estimate the viscosity or flowability of oil on the basis of the oil temperature detected by the oil temperature sensor 21.

Other than the above-described oil temperature sensor 21, a rotation speed sensor 22 is provided. The rotation speed sensor 22 detects the rotation speed of the rotor (not shown) of the MOP 18. As will be described later, it is possible to obtain the amount of oil that is supplied from the MOP 18 to the planetary gear mechanism of the power split device 4 on the basis of the rotation speed of the MOP 18, detected by the rotation speed sensor 22.

A vehicle speed sensor 23 is provided. The vehicle speed sensor 23 detects the speed of the vehicle Ve. As will be described later, when the mechanical oil pump that is driven by torque, which is transmitted from the drive shaft 5 side, to generate hydraulic pressure or a dip lubrication mechanism formed of the ring gear 15 of the differential gear 14 is used as the oil supply mechanism according to the disclosure, it is possible to estimate the amount of oil that is supplied from the oil supply mechanism to the planetary gear mechanism of the power split device 4 on the basis of the vehicle speed detected by the vehicle speed sensor 23.

An electronic control unit (ECU) 24 is provided in order to execute control for operating the engine 1, control for rotating the first motor 2 and the second motor 3, control for rotating the pump motor 20, and the like. The ECU 24 is, for example, mainly formed of a microcomputer. For example, detected values of the oil temperature sensor 21, the rotation speed sensor 22, the vehicle speed sensor 23, and the like, are input to the ECU 24. The ECU 24 is configured to execute computation by using those input data, prestored data, and the like, and output a control command signal on the basis of the computed result.

The thus configured vehicle Ve is controlled by effectively utilizing the engine 1, the first motor 2 and the second motor 3 as the driving force sources such that energy efficiency or fuel economy improves. Specifically, an HV drive mode or an EV drive mode is selected as needed in response to the traveling state of the vehicle Ve. In the HV drive mode, the vehicle Ve is caused to travel by using the output of at least the engine 1. In the EV drive mode, the vehicle Ve is caused to travel by using the output of at least one of the first motor 2 or the second motor 3 while the operation of the engine 1 is stopped.

Between the above-described drive modes, particularly, the EV drive mode is divided into a first EV drive mode and a second EV drive mode. In the first EV drive mode, the vehicle Ve is caused to travel by using the output of the second motor 3. In the second EV drive mode, the vehicle Ve is caused to travel at a high power by using the output of both the motor generators, that is, the first motor 2 and the second motor 3. The first EV drive mode or the second EV drive mode is selected as needed in response to the traveling state of the vehicle Ve.

In the first EV drive mode, the second motor 3 is controlled as a motor so as to be rotated in a positive direction (the rotation direction of the output shaft 1a of the engine 1) to output torque. The vehicle Ve is caused to travel by using a driving force generated by using torque output from the second motor 3.

In the second EV drive mode, the vehicle Ve is caused to travel by using the output of both the first motor 2 and the second motor 3. In the second EV drive mode, the first motor 2 is controlled as a motor so as to be rotated in a negative direction (the direction opposite to the rotation direction of the output shaft 1a of the engine 1) to output torque. The second motor 3 is controlled as a motor so as to be rotated in the positive direction to output torque. The vehicle Ve is caused to travel by using a driving force generated by using torque output from the first motor 2 and torque output from the second motor 3. In this case, because torque in the negative direction acts on the output shaft 1a of the engine 1, the one-way brake 10 is engaged. Therefore, in the state where the rotation of the output shaft 1a of the engine 1 and the rotation of the carrier 8 in the planetary gear mechanism of the power split device 4 are stopped and fixed, it is possible to efficiently cause the vehicle Ve to travel by using the torque output from both the first motor 2 and the second motor 3.

As described above, the vehicle Ve is able to switch between the HV drive mode and the EV drive mode as needed in response to the traveling state, the required driving force, and the like. As described above, in the EV drive mode, because the operation of the engine 1 is stopped, it is not possible to generate hydraulic pressure with the use of the MOP 18. When the first EV drive mode is set within the EV drive mode, oil is particularly required to lubricate and cool the second motor 3. When the second EV drive mode is set, oil is particularly required to lubricate and cool the planetary gear mechanism of the power split device 4 in addition to cooling of the first motor 2 and the second motor 3. In this case, as described above, in the state where the one-way brake 10 is engaged and the rotation of the output shaft 1a and the rotation of the carrier 8 are stopped, the first motor 2 and the second motor 3 are respectively rotated in opposite directions. That is, in the planetary gear mechanism of the power split device 4, the sun gear 6 and the ring gear 7 rotate in opposite directions in the state where the rotation of the carrier 8 is stopped. Therefore, the pinion gears 9 supported by the carrier 8 rotate on their axes in the state where the revolution of the pinion gears 9 around the sun gear 6 is stopped. The rotation speed of rotation on their axes in this case is determined by the differential rotation speed between the sun gear 6 and the ring gear 7; however, the sun gear 6 and the ring gear 7 rotate in mutually opposite directions, so the pinion gears 9 rotate on their axes at a high speed. Therefore, particularly, when the second EV drive mode is set, it is required to supply a sufficient amount of oil to the planetary gear mechanism of the power split device 4 in order to prevent seizure of the pinion gears 9 that rotate at a high speed as described above.

When the vehicle Ve is a plugin hybrid vehicle (PHV) that is able to charge a drive battery with electric power supplied from an external power supply and that is equipped with a battery having a relatively large capacity, the frequency of the EV drive mode as described above increases as compared to an ordinary hybrid vehicle (HV). In the case of such a PHV, even when the first EV drive mode is set, a continuous operation time in the first EV drive mode becomes long, and there is a case where it is required to lubricate and cool the planetary gear mechanism with the use of the EOP 19 as in the case where the second EV drive mode is set.

Therefore, in the vehicle Ve, the EOP 19 is driven when the EV drive mode is set or when the engine 1 is stopped. That is, hydraulic pressure is generated with the use of the EOP 19 by starting up the pump motor 20, and oil is supplied to the planetary gear mechanism of the power split device 4.

As described above, in the configuration example shown in FIG. 1, the EOP 19 that is the electric oil pump is provided as the oil supply mechanism according to the disclosure. In contrast, in the disclosure, an oil supply mechanism configured as shown in FIG. 2 or an oil supply mechanism configured as shown in FIG. 3 may be employed.

Figure 2:
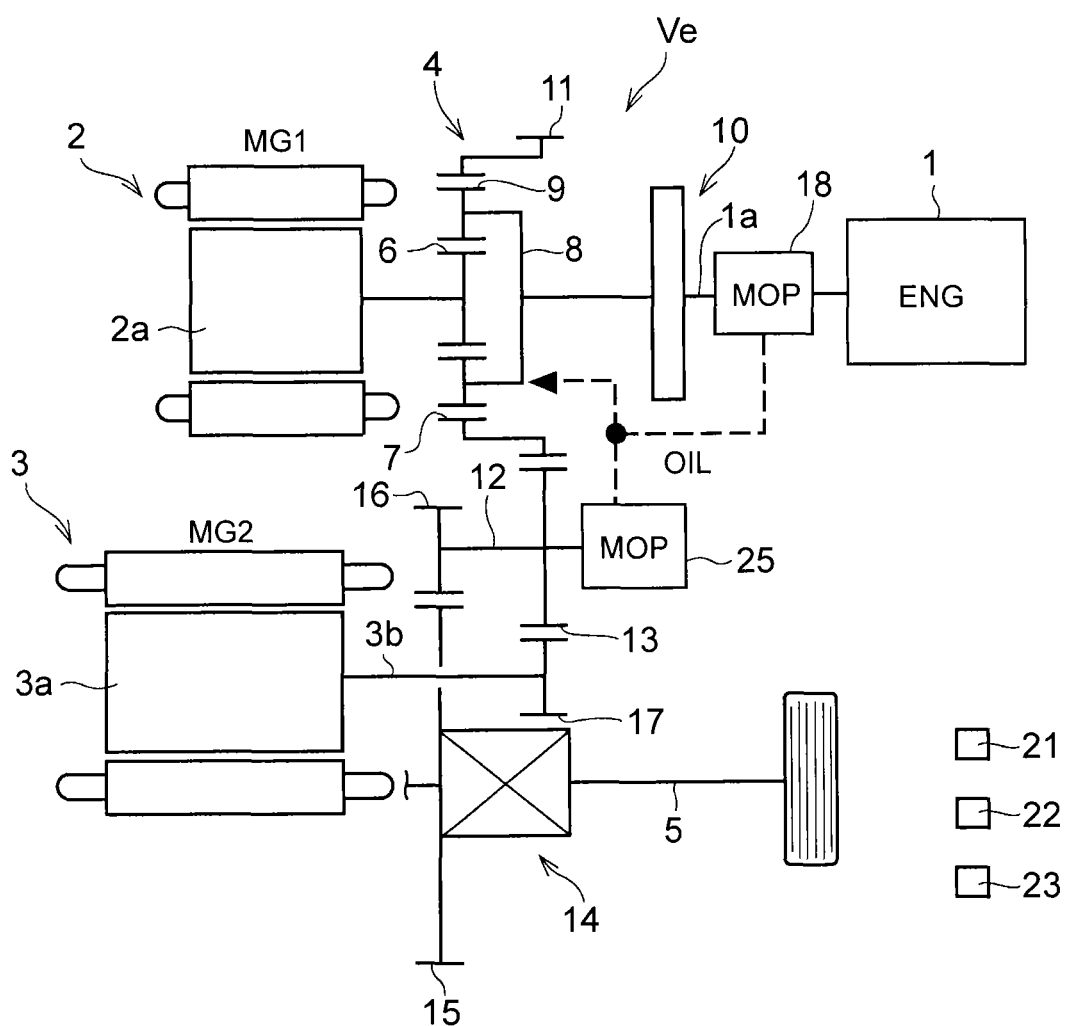
FIG. 2 is a view that shows another example of a hybrid vehicle that may be a controlled target according to the disclosure.

The oil supply mechanism shown in FIG. 2 includes an oil pump 25 instead of the EOP 19 in the configuration shown in FIG. 1. The oil pump 25 (hereinafter, MOP 25), as well as the above-described MOP 18, is an existing mechanical oil pump having a general configuration. The MOP 25 is configured to be driven by torque, which is transmitted from the drive shaft 5 side, to generate hydraulic pressure and supply oil to the planetary gear mechanism of the power split device 4. Specifically, the rotor (not shown) of the MOP 25 is configured to rotate together with the drive shaft 5. Therefore, even when the rotation of the output shaft 1a of the engine 1 is stopped, the MOP 25 is driven in the state where the vehicle Ve is traveling and the drive shaft 5 is rotating. Therefore, it is possible to supply oil to the planetary gear mechanism of the power split device 4 by generating hydraulic pressure with the use of the MOP 25.

Figure 3:
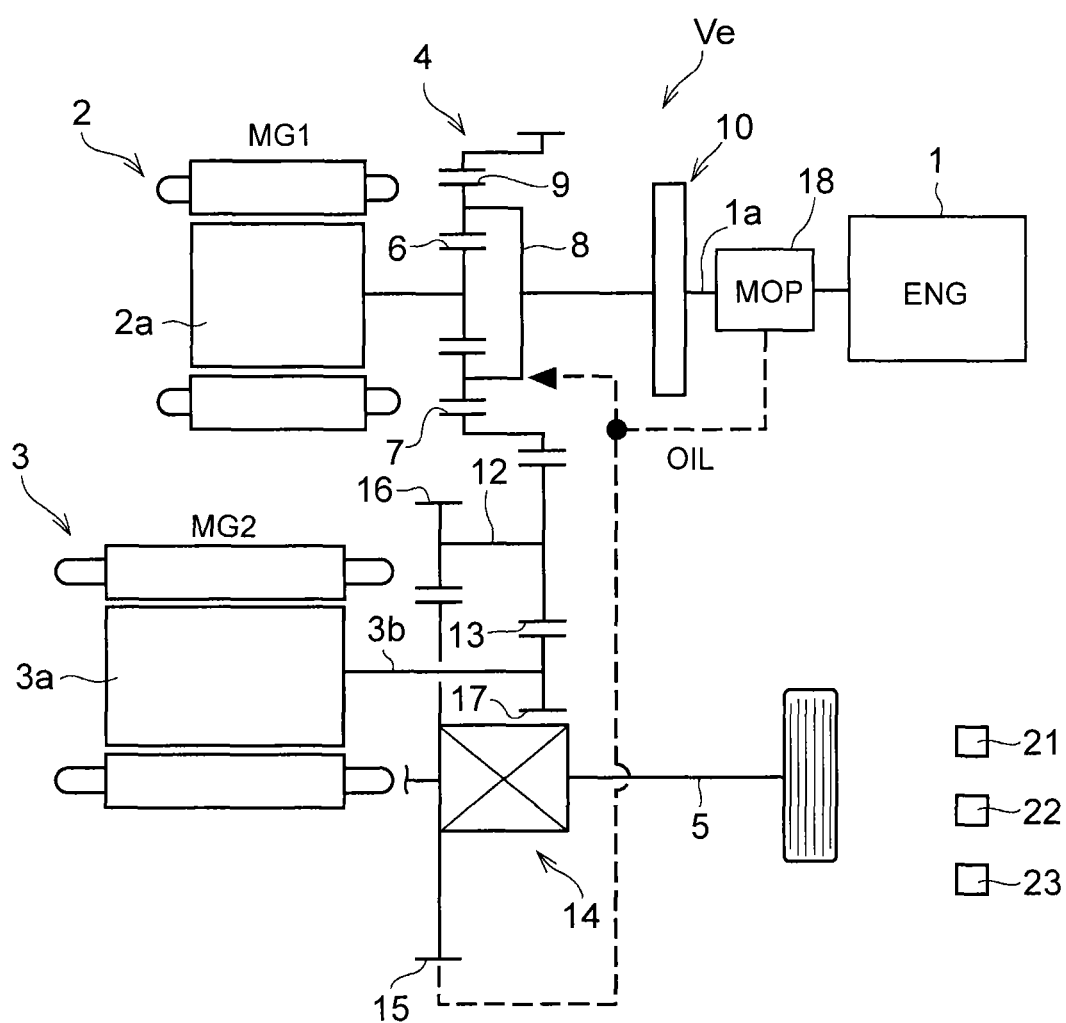
FIG. 3 is a view that shows further another example of a hybrid vehicle that may be a controlled target according to the disclosure.

The oil supply mechanism shown in FIG. 3 includes the dip lubrication mechanism formed of the ring gear 15 of the differential gear 14 instead of the EOP 19 in the configuration shown in FIG. 1 or the MOP 25 in the configuration shown in FIG. 2. The dip lubrication mechanism formed of the ring gear 15 is a configuration that is conventionally generally used in a vehicle as a mechanical for supplying oil. The dip lubrication mechanism formed of the ring gear 15 is configured to, when the ring gear 15 is rotated by torque that is transmitted from the drive shaft 5 side, supply oil, which is dipped by the ring gear 15, to the planetary gear mechanism of the power split device 4. Therefore, even when the rotation of the output shaft 1a of the engine 1 is stopped, it is possible to supply oil to the planetary gear mechanism of the power split device 4 in the state where the vehicle Ve is traveling and the drive shaft 5 is rotating. Because the dip lubrication mechanism formed of the ring gear 15 is an existing general configuration as described above and is a simple mechanism, the dip lubrication mechanism may be used together with the EOP 19 in the configuration shown in FIG. 1 or the MOP 25 in the configuration shown in FIG. 2.

As described above, particularly, when the vehicle Ve travels in the EV mode by using torque output from both the first motor 2 and the second motor 3, the pinion gears 9 of the power split device 4 rotate at a high speed. If oil that is supplied to the power split device 4 becomes insufficient in this case, there is a concern that seizure occurs in the pinion gears 9. A controller for the vehicle Ve is configured to execute control shown in the following example in order to prevent occurrence of the above-described seizure.

Figure 4:
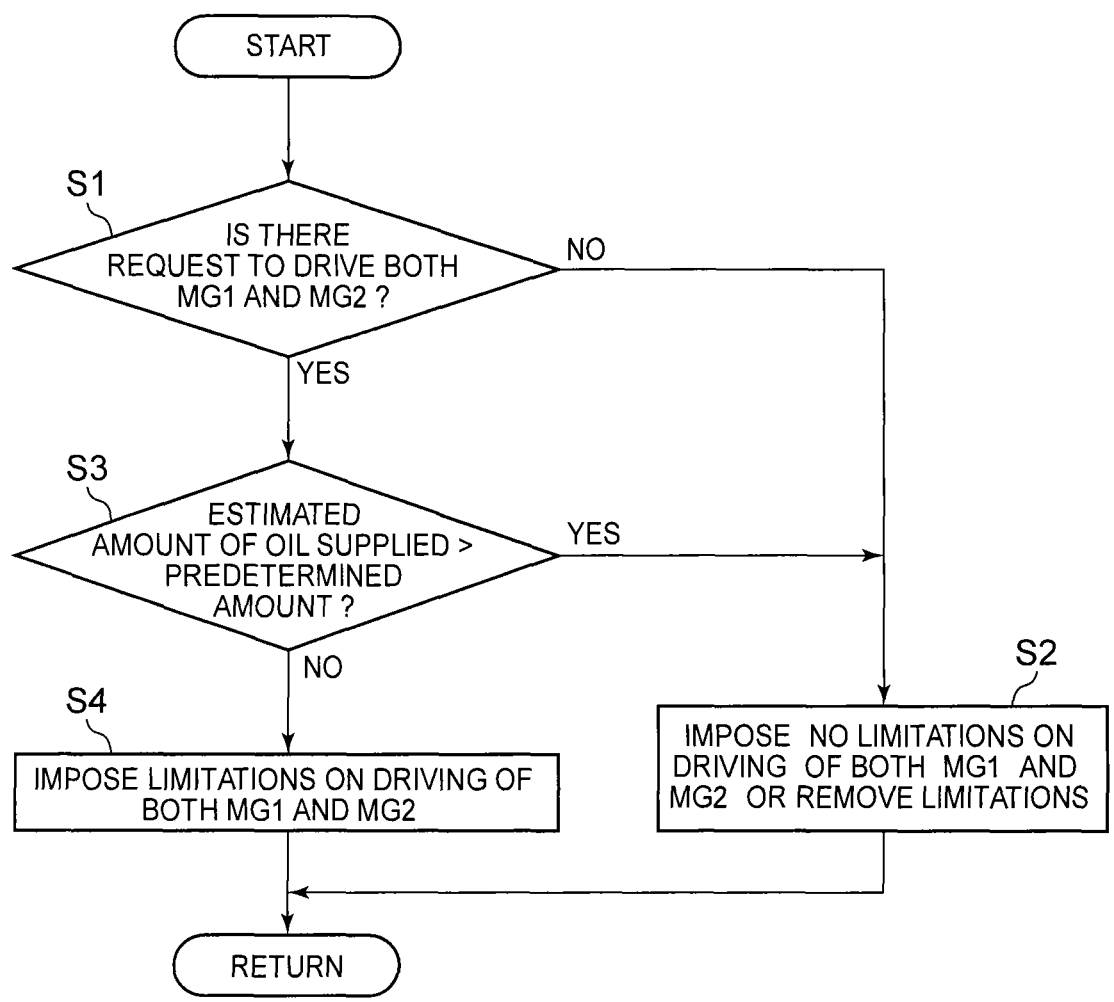
FIG. 4 is a flowchart for illustrating the outline of control that is executed by a controller according to the disclosure.

The outline of control that is executed in the controller according to the disclosure is shown in the flowchart of FIG. 4. Control shown in the flowchart of FIG. 4 is repeatedly executed at predetermined short time intervals. In the flowchart of FIG. 4, initially, it is determined whether there is a request to drive both the first motor 2 and the second motor 3, that is, whether there is a request for the second EV drive mode for causing the vehicle Ve to travel by using the output of both the first motor 2 and the second motor 3 (step S1).

When negative determination is made in step Si because of the fact that there is no request to drive both the first motor 2 and the second motor 3, the process proceeds to step S2, after which the routine once ends. In step S2, in the second EV drive mode, both the first motor 2 and the second motor 3 are allowed to be driven without any particular limitations. This is an ordinary state. Therefore, at the beginning of the routine, the routine once ends without particularly executing any control in step S2. As will be described later, when the process proceeds to step S2 after imposing limitations on the driving of both the first motor 2 and the second motor 3, the limitations on the driving of both are removed, and both the first motor 2 and the second motor 3 are returned to the ordinary state. After that, the routine once ends.

On the other hand, when affirmative determination is made in step S1 because of the fact that there is a request to drive both the first motor 2 and the second motor 3, the process proceeds to step S3. In step S3, the amount of oil that is supplied to the power split device 4 is estimated, and it is determined whether the estimated amount of oil is larger than a predetermined amount. For example, when oil having a high viscosity due to a low oil temperature is supplied to the power split device 4 by the EOP 19, it may be estimated that the amount of oil supplied becomes small. When oil is supplied to the power split device 4 by the MOP 25 or the dip lubrication mechanism formed of the ring gear 15 in a state where the vehicle speed is low as well, it may be estimated that the amount of oil supplied becomes small. The predetermined amount of oil supplied is at least the amount of oil that is required not to cause an abnormality, such as seizure and excessive abrasion, in the planetary gear mechanism of the power split device 4. A more specific method of obtaining the estimated amount of oil supplied will be described later.

When affirmative determination is made in step S3 because of the fact that the estimated amount of oil supplied is larger than the predetermined amount, the process proceeds to the above-described step S2, and similar control is executed. After that, the routine once ends.

In contrast, when negative determination is made in step S3 because of the fact that the estimated amount of oil supplied is smaller than or equal to the predetermined amount, the process proceeds to step S4. In step S4, limitations on the driving of both the first motor 2 and the second motor 3 are imposed. Specifically, the operation state of the first motor 2 is limited such that load on the planetary gear mechanism of the power split device 4 decreases. For example, the operation time of the first motor 2 is limited. Alternatively, the torque output from the first motor 2 is limited. Alternatively, the rotation speed of the first motor 2 is limited. The limitations on the operation state of the first motor 2 will be more specifically described later. After limitations on the driving of both the first motor 2 and the second motor 3 are imposed as described above, the routine once ends.

Specific examples of the method of estimating the above-described estimated amount of oil supplied and the method of limiting the operation state of the first motor 2 are shown in the flowcharts from FIG. 5 to FIG. 8.

Figure 5:
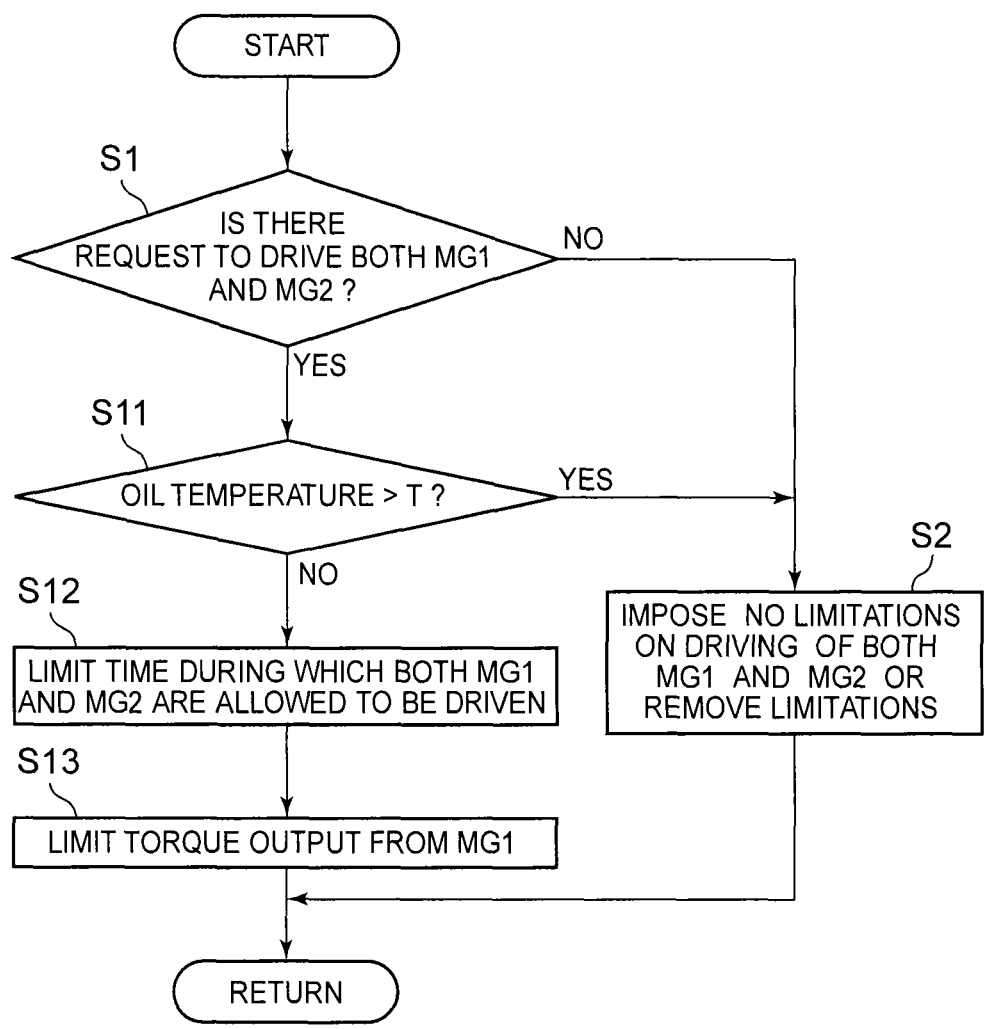
FIG. 5 is a flowchart for illustrating a specific example of control that is executed by the controller according to the disclosure.

The specific example shown in FIG. 5 is particularly a control example in which, when the vehicle Ve includes the EOP 19 as the oil supply mechanism, the amount of oil that is supplied to the planetary gear mechanism of the power split device 4 is estimated on the basis of the oil temperature. In the flowchart shown in FIG. 5, the control details of step S1 and step S2 are similar to the control details of step S1 and step S2 in the above-described flowchart of FIG. 4.

Therefore, when affirmative determination is made in step Si because of the fact that there is a request to drive both the first motor 2 and the second motor 3, the process proceeds to step S11. In step S11, the oil temperature is detected, and it is determined whether the oil temperature is higher than a predetermined temperature T. Oil has a higher viscosity and a lower flowability as the oil temperature decreases. Particularly, in the case where oil is supplied to the planetary gear mechanism of the power split device 4 by the EOP 19, because the output of the EOP 19 is generally smaller than that of the MOP 18, the amount of oil that is supplied from the EOP 19 to the planetary gear mechanism decreases when the viscosity of oil becomes higher because of a low oil temperature. When oil is supplied to the planetary gear mechanism by the dip lubrication mechanism formed of the ring gear 15 or the MOP 25 that is driven by torque that is transmitted from the drive shaft 5 as well, the amount of oil supplied decreases when the viscosity of oil is high because of a low oil temperature. For these reasons, the viscosity of oil increases as the oil temperature decreases, and it may be estimated that the amount of oil supplied decreases accordingly. That is, by detecting the oil temperature, it is possible to estimate the amount of oil that is supplied to the planetary gear mechanism on the basis of the oil temperature. Therefore, when affirmative determination is made in step S11 because of the fact that the oil temperature is higher than the predetermined temperature T, it may be determined that oil is sufficiently supplied to the planetary gear mechanism of the power split device 4. Therefore, the process proceeds to step S2 in this case, and both the first motor 2 and the second motor 3 are allowed to be driven without any particular limitations as in the case of the above-described flowchart of FIG. 4. After that, the routine once ends.

In contrast, when negative determination is made in step S11 because of the fact that the oil temperature is lower than or equal to the predetermined temperature T, the process proceeds to step S12 and step S13. In these step S12 and step S13, the operation state of the first motor 2 is limited such that load on the planetary gear mechanism of the power split device 4 decreases. Specifically, in step S12, a time during which both the first motor 2 and the second motor 3 are allowed to be driven is limited. For example, an upper limit is set to the operation time when the first motor 2 is operated to output power. In step S13, the torque output from the first motor 2 is limited. For example, an upper limit is set to the output torque at the time when the first motor 2 is operated to output power.

As described above, when the oil temperature is lower than or equal to the predetermined temperature T, the amount of oil that is supplied to the planetary gear mechanism decreases because the viscosity of oil is high. On the other hand, for example, oil adhering to the pinion gears 9 of the planetary gear mechanism is easy to accumulate on the surfaces of the pinion gears 9 because of the high viscosity. Therefore, in this case, no limit is particularly set to the rotation speed at the time when the first motor 2 is operated. When the oil temperature is lower than or equal to the predetermined temperature T, the temperature of the second motor 3 is low, and it may be estimated that there is still a margin of output of the second motor 3. Therefore, in this case, it is possible to meet the required driving force by compensating for a driving force by increasing the torque output from the second motor 3 by the amount by which the torque output from the first motor 2 is limited.

Control in step S12 and control in step S13 may be executed in parallel with each other. Alternatively, the controls may be executed by interchanging the control sequence. Alternatively, only one of step S12 or step S13 may be executed.

As described above, after limitations are imposed on the driving of both the first motor 2 and the second motor 3 in step S12 and step S13, the routine once ends.

Figure 6:
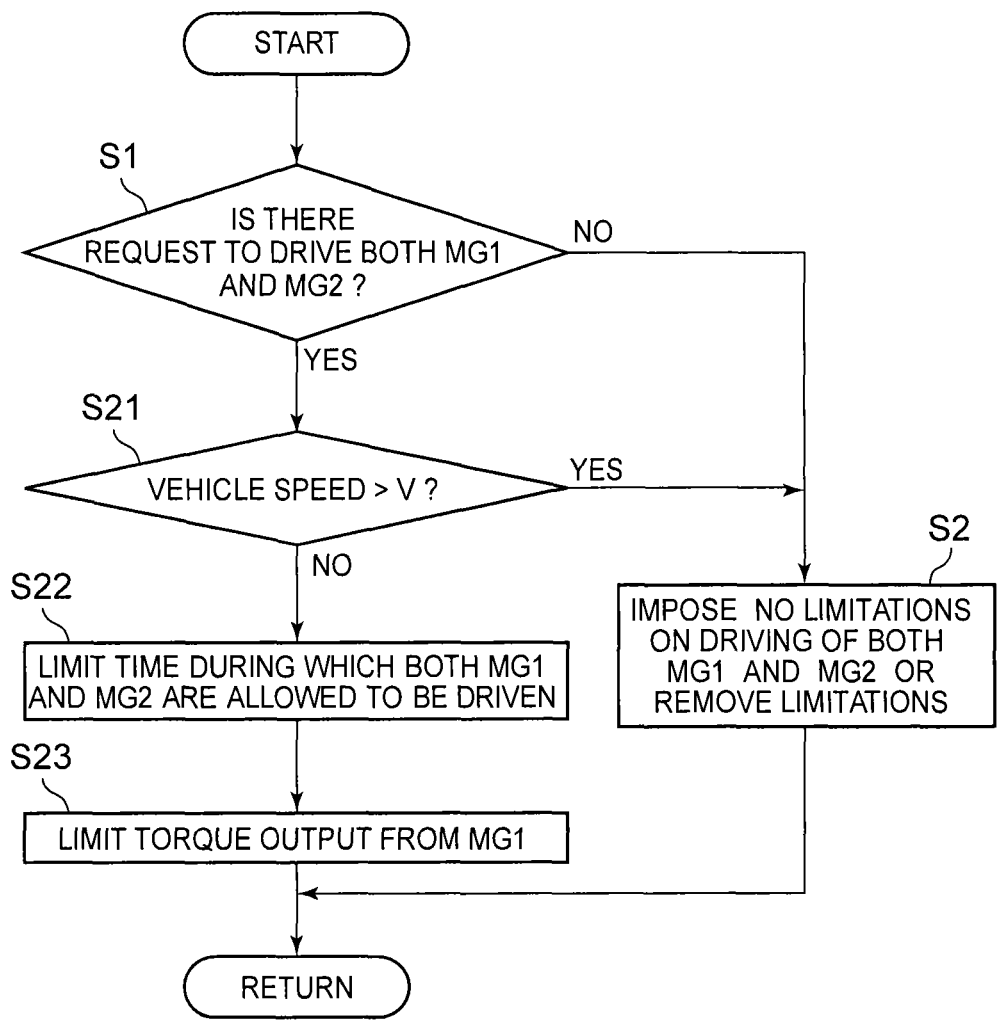
FIG. 6 is a flowchart for illustrating another example of control that is executed by the controller according to the disclosure.

A specific example shown in FIG. 6 is a control example in which the amount of oil that is supplied to the planetary gear mechanism of the power split device 4 is estimated on the basis of the vehicle speed particularly when the vehicle Ve includes the MOP 25 as the oil supply mechanism or when the vehicle Ve includes the dip lubrication mechanism formed of the ring gear 15 in the differential gear 14 as the oil supply mechanism. In the flowchart of FIG. 6, the control details of step Si and step S2 are similar to the control details of step Si and step S2 in the above-described flowchart of FIG. 4.

Thus, when affirmative determination is made in step Si because of the fact the there is a request to drive both the first motor 2 and the second motor 3, the process proceeds to step S21. In step S21, the vehicle speed is detected, and it is determined whether the vehicle speed is higher than a predetermined speed V. As described above, the MOP 25 is the mechanical oil pump configured to be driven by torque that is output from the drive shaft 5 side to generate hydraulic pressure and to supply oil to the planetary gear mechanism of the power split device 4. Therefore, the rotation speed (pump rotation speed) of the rotor of the MOP 25 fluctuates depending on the rotation speed of the drive shaft 5, that is, the vehicle speed. For this reason, as the vehicle speed decreases, the pump rotation speed of the MOP 25 decreases, and the amount of oil discharged decreases. It may be estimated that the amount of oil supplied decreases accordingly. The dip lubrication mechanism formed of the ring gear 15 is configured to, when the ring gear 15 is rotated by torque that is output from the drive shaft 5 side, supply oil, which is dipped by the ring gear 15, to the planetary gear mechanism of the power split device 4. The rotation speed of the ring gear 15 fluctuates depending on the rotation speed of the drive shaft 5, that is, the vehicle speed. Therefore, the amount of oil that is supplied by the dip lubrication mechanism formed of the ring gear 15 also decreases as the vehicle speed decreases.

In this way, in the specific example shown in FIG. 6, by detecting the vehicle speed, it is possible to estimate the amount of oil that is supplied to the planetary gear mechanism on the basis of the vehicle speed. Therefore, when affirmative determination is made in step S21 because of the fact that the vehicle speed is higher than the predetermined speed V, it may be determined that oil is sufficiently supplied to the planetary gear mechanism of the power split device 4. Therefore, in this case, the process proceeds to step S2, and both the first motor 2 and the second motor 3 are allowed to be driven without any particular limitations as in the case of step S2 in the above-described flowchart of FIG. 4. After that, the routine once ends.

In contrast, when negative determination is made in step S21 because of the fact that the vehicle speed is lower than or equal to the predetermined speed V, the process proceeds to step S22 and step S23. In these step S22 and step S23, the operation state of the first motor 2 is limited such that load on the planetary gear mechanism of the power split device 4 decreases. Specifically, in step S22, a time during which both the first motor 2 and the second motor 3 are allowed to be driven is limited. For example, an upper limit is set to the operation time at the time when the first motor 2 is operated to output power. In step S23, the torque output from the first motor 2 is limited. For example, an upper limit is set to the output torque at the time when the first motor 2 is operated to output power.

Control in step S22 and control in step S23 may be executed in parallel with each other. Alternatively, the controls may be executed by interchanging the control sequence. Alternatively, only one of step S22 or step S23 may be executed.

As described above, after limitations are imposed on the driving of both the first motor 2 and the second motor 3 in step S22 and step S23, the routine once ends.

Figure 7:
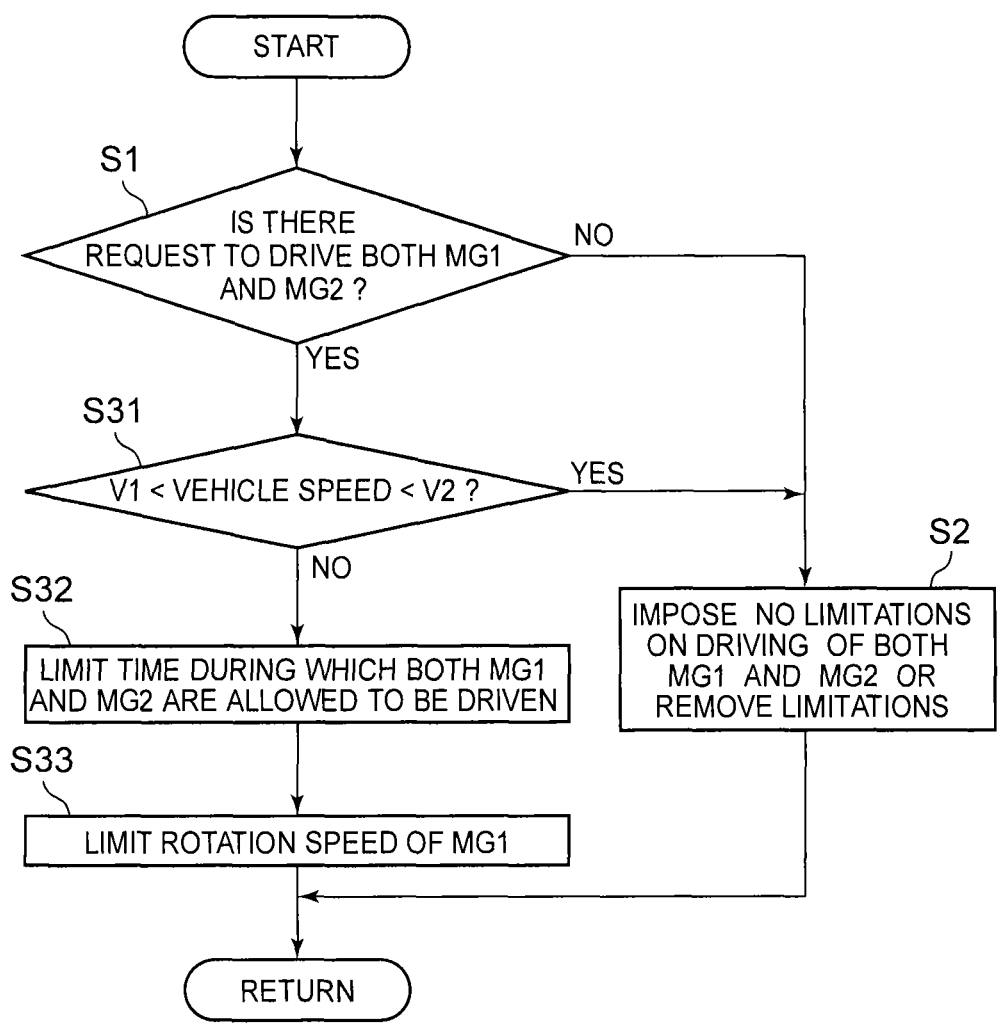
FIG. 7 is a flowchart for illustrating further another example of control that is executed by the controller according to the disclosure.

A specific example shown in FIG. 7 is a control example in which the amount of oil that is supplied to the planetary gear mechanism of the power split device 4 is estimated on the basis of the vehicle speed particularly when the vehicle Ve includes the dip lubrication mechanism formed of the ring gear 15 in the differential gear 14 as the oil supply mechanism. In the flowchart shown in FIG. 7, the control details of step Si and step S2 are similar to the control details of step Si and step S2 in the above-described flowchart of FIG. 4.

Therefore, when affirmative determination is made in step Si because of the fact that there is a request to drive both the first motor 2 and the second motor 3, the process proceeds to step S31. In step S31, the vehicle speed is detected, and it is determined whether the vehicle speed is higher than a predetermined speed V1 and lower than a predetermined speed V2. The predetermined speed V2 is a relatively high speed higher than the relatively low predetermined speed V1. As described above, the amount of oil that is supplied by the dip lubrication mechanism formed of the ring gear 15 decreases as the vehicle speed decreases. On the other hand, because the dip lubrication mechanism formed of the ring gear 15 is not configured to generate hydraulic pressure, as is done by the oil pump, so the dip lubrication mechanism is not able to, for example, forcibly lubricate the pinion gears 9 of the planetary gear mechanism. Therefore, when the vehicle speed becomes higher than or equal to the predetermined speed V2 and the rotation speed of each pinion gear 9 increases, oil that is supplied to the pinion gears 9 by the dip lubrication mechanism formed of the ring gear 15 is rejected by the pinion gears 9 because of centrifugal force. As a result, the amount of oil that is supplied from the dip lubrication mechanism formed of the ring gear 15 to the planetary gear mechanism decreases. For these reasons, in the specific example shown in FIG. 7, not only when the vehicle speed is lower than or equal to the predetermined speed V1 but also when the vehicle speed is higher than or equal to the predetermined speed V2, it may be estimated that the amount of oil supplied decreases. That is, in this case as well, by detecting the vehicle speed, it may be estimated that the amount of oil that is supplied to the planetary gear mechanism on the basis of the vehicle speed.

Therefore, when affirmative determination is made in step S31 because of the fact that the vehicle speed is higher than the predetermined speed V1 and lower than the predetermined speed V2, it may be determined that oil is sufficiently supplied to the planetary gear mechanism of the power split device 4. Therefore, in this case, the process proceeds to step S2, and both the first motor 2 and the second motor 3 are allowed to be driven without any particular limitations as in the case of step S2 in the above-described flowchart of FIG. 4. After that, the routine once ends.

In contrast, when negative determination is made in step S31 because of the fact that the vehicle speed is lower than or equal to the predetermined speed V1 or higher than or equal to the predetermined speed V2, the process proceeds to step S32 and step S33. In these step S32 and step S33, the operation state of the first motor 2 is limited such that load on the planetary gear mechanism of the power split device 4 decreases. Specifically, in step S32, a time during which both the first motor 2 and the second motor 3 are allowed to be driven is limited. For example, an upper limit is set to the operation time at the time when the first motor 2 is operated to output power. In step S33, the rotation speed of the first motor 2 is limited. For example, in order to suppress the rotation speed of each pinion gear 9, an upper limit is set to the rotation speed at the time when the first motor 2 is operated.

Control in step S32 and control in step S33 may be executed in parallel with each other. Alternatively, the controls may be executed by interchanging the control sequence. Alternatively, only one of step S32 or step S33 may be executed.

As described above, after limitations are imposed on the driving of both the first motor 2 and the second motor 3 in step S32 and step S33, the routine once ends.

Figure 8:
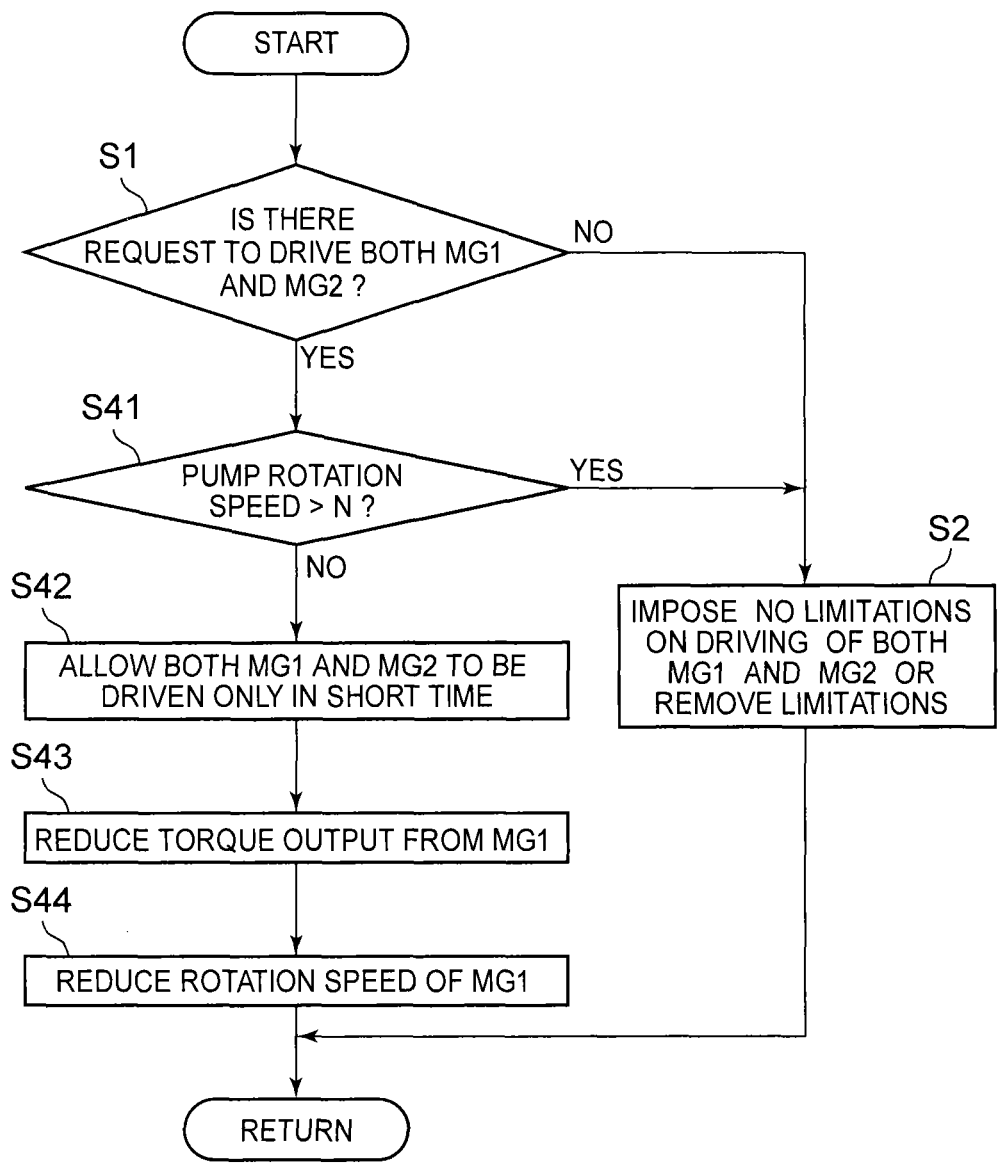
FIG. 8 is a flowchart for illustrating yet another example of control that is executed by the controller according to the disclosure.

A specific example shown in FIG. 8 is a control example in which the amount of oil that is supplied to the planetary gear mechanism of the power split device 4 is estimated on the basis of the pump rotation speed of the EOP 19 or MOP 25 instead of the oil temperature particularly when the vehicle Ve includes the EOP 19 as the oil supply mechanism or when the vehicle Ve includes the MOP 25 as the oil supply mechanism. In the flowchart shown in FIG. 8, the control details of step Si and step S2 are similar to the control details of step Si and step S2 in the above-described flowchart of FIG. 4.

Therefore, when affirmative determination is made in step Si because of the fact that there is a request to drive both the first motor 2 and the second motor 3, the process proceeds to step S41. In step S41, the pump rotation speed is detected, and it is determined whether the pump rotation speed is higher than a predetermined rotation speed N. Even when any one of the EOP 19 or the MOP 25 is used, when the pump rotation speed thereof is low, the amount of oil that is supplied from the EOP 19 or the MOP 25 to the planetary gear mechanism decreases. For this reason, it may be estimated that the amount of oil supplied decreases as the pump rotation speed decreases. That is, even when the oil temperature is not detected unlike the above-described control example shown in FIG. 5, by detecting the pump rotation speed of the pump that is used as the oil supply mechanism, it is possible to estimate the amount of oil that is supplied to the planetary gear mechanism on the basis of the pump rotation speed. Therefore, when affirmative determination is made in step S41 because of the fact that the pump rotation speed is higher than the predetermined rotation speed N, it may be determined that oil is sufficiently supplied to the planetary gear mechanism of the power split device 4. Therefore, in this case, the process proceeds to step S2, and both the first motor 2 and the second motor 3 are allowed to be driven without any particular limitations as in the case of step S2 in the above-described flowchart of FIG. 4. After that, the routine once ends.

In contrast, when negative determination is made in step S41 because of the fact that the pump rotation speed is lower than or equal to the predetermined rotation speed N, the process proceeds to step S42, step S43 and step S44. In these step S42, step S43 and step S44, the operation state of the first motor 2 is limited such that load on the planetary gear mechanism of the power split device 4 decreases. Specifically, in step S42, a time during which both the first motor 2 and the second motor 3 are allowed to be driven is limited. For example, an upper limit is set to the operation time at the time when the first motor 2 is operated to output power. In step S43, the torque output from the first motor 2 is limited. For example, an upper limit is set to the output torque at the time when the first motor 2 is operated to output power. In step S44, the rotation speed of the first motor 2 is limited. For example, an upper limit is set to the rotation speed at the time when the first motor 2 is operated.

Control in step S42, control in step S43 and control in step S44 may be executed in parallel with each other. Alternatively, the controls may be executed by interchanging the control sequence. Alternatively, only any one or two of step S42, step S43 or step S44 may be executed.

As described above, after limitations are imposed on the driving of both the first motor 2 and the second motor 3 in step S42, step S43 and step S44, the routine once ends.

What is claimed is:

1. A hybrid vehicle comprising:
   an engine;
   a first motor;
   a second motor;
   a gear transmission mechanism configured to transmit torque, output from the first motor, to a drive shaft side;
   an oil supply mechanism configured to be driven by power other than power of the engine, the oil supply mechanism being configured to supply oil to the gear transmission mechanism; and
   an electronic control unit,
   wherein the gear transmission mechanism is a planetary gear mechanism including, as rotating elements, a sun gear, a ring gear and a carrier to which torque output from the engine is transmitted, the first motor is coupled to one of the sun gear and the ring gear, an output member that transmits power to the drive shaft side is coupled to the other one of the sun gear and the ring gear, the second motor is coupled to the output member, a brake mechanism that selectively stops rotation of the carrier is coupled to the carrier, and
   when the hybrid vehicle travels by using torque output from both the first motor and the second motor in a state where operation of the engine is stopped and rotation of the carrier is stopped by the brake mechanism, the electronic control unit is configured to (i) estimate an amount of the oil that is supplied from the oil supply mechanism to the planetary gear mechanism and (ii) when the estimated amount of the oil supplied is smaller than or equal to a predetermined amount, limit an operation state of the first motor such that load on the planetary gear mechanism decreases.

2. The hybrid vehicle according to claim 1, wherein
the electronic control unit is configured to estimate the amount of the oil supplied on the basis of an oil temperature of the oil, and
the electronic control unit is configured to reduce an upper limit of the torque output from the first motor as the oil temperature decreases.

3. The hybrid vehicle according to claim 1, wherein
the oil supply mechanism includes an oil pump that is driven by torque that is transmitted from the drive shaft side, the oil pump is configured to supply oil to the planetary gear mechanism, and
the electronic control unit is configured to estimate the amount of the oil supplied on the basis of a vehicle speed, and is configured to reduce an upper limit of the torque output from the first motor as the vehicle speed decreases.

4. The hybrid vehicle according to claim 1, wherein
the oil supply mechanism is a mechanism configured to supply the planetary gear mechanism with oil that is dipped by a gear that rotates by using torque that is transmitted from the drive shaft side, and
the electronic control unit is configured to estimate the amount of the oil supplied on the basis of a vehicle speed, and is configured to reduce an upper limit of the torque output from the first motor as the vehicle speed decreases.

5. The hybrid vehicle according to claim 1, wherein
the electronic control unit is configured to estimate the amount of the oil supplied on the basis of a vehicle speed, and
the electronic control unit is configured to, when the vehicle speed falls outside a predetermined vehicle speed range, reduce an upper limit of a rotation speed of the first motor.

6. The hybrid vehicle according to claim 1, wherein
the oil supply mechanism includes an oil pump that is driven by torque that is transmitted from the drive shaft side, the oil pump is configured to supply oil to the planetary gear mechanism, and
the electronic control unit is configured to estimate the amount of the oil supplied on the basis of a pump rotation speed of the oil pump, and is configured to reduce an upper limit of the torque output from the first motor as the pump rotation speed decreases.

7. The hybrid vehicle according to claim 1, wherein
the oil supply mechanism includes an electric oil pump that is driven by torque of an electric motor, the electric oil pump is configured to supply oil to the planetary gear mechanism, and
the electronic control unit is configured to estimate the amount of the oil supplied on the basis of an oil temperature of the oil.

8. The hybrid vehicle accord to claim 7, wherein the electronic control unit is configured to reduce an upper limit of the torque output from the first motor as the oil temperature decreases.

9. The hybrid vehicle accord to claim 7, wherein the electronic control unit is configured to limit time during which the first motor and the second motor are allowed to be driving as the oil temperature decreases.

* * * * *